(12) United States Patent
Hoen

(10) Patent No.: US 6,522,802 B2
(45) Date of Patent: Feb. 18, 2003

(54) OPTICAL SWITCH USING SUPPORT STRUCTURES WITH BOTH FIXED MIRRORS AND PIVOTABLE MIRRORS

(75) Inventor: Storrs T. Hoen, Brisbane, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 16 days.

(21) Appl. No.: 09/735,352

(22) Filed: Dec. 11, 2000

(65) Prior Publication Data
US 2002/0181846 A1 Dec. 5, 2002

(51) Int. Cl.⁷ .................................. G02B 6/35
(52) U.S. Cl. ............................ 385/18; 385/17
(58) Field of Search ...................... 385/16–24

(56) References Cited

U.S. PATENT DOCUMENTS

| | | | |
|---|---|---|---|
| 5,177,348 A | 1/1993 | Laor | 250/201.1 |
| 5,524,153 A | 6/1996 | Laor | 385/16 |
| 5,621,829 A | 4/1997 | Ford | 385/22 |
| 5,986,381 A | 11/1999 | Hoen et al. | 310/309 |
| 6,253,001 B1 * | 6/2001 | Hoen | 385/17 |
| 6,320,993 B1 * | 11/2001 | Laor | 385/16 |
| 6,327,398 B1 * | 12/2001 | Solgaard et al. | 385/18 |

* cited by examiner

Primary Examiner—Akm E. Ullah
Assistant Examiner—Jerry T Rahll

(57) ABSTRACT

An optical switch uses composite mirrors having individually addressable pivotable micromirrors on one side and a fixed mirror arrangement on another side. Preferably, separate composite mirrors are used in each reflection of an optical beam from an input to an output, with at least one fixed mirror and at least two pivotable mirrors defining the optical path. The function of the first pivotable mirror along the path is to select a target output, while the purpose of the second pivotable mirror is to achieve a low loss coupling to the target output. By combining the fixed mirrors with the micromirror arrays into a single structure, the spacing between adjacent arrays of inputs and the spacing between adjacent arrays of outputs can be reduced. Thus, using the composite mirrors increases the maximum number of optical inputs and outputs for beams having fixed waists.

21 Claims, 13 Drawing Sheets

OPTICAL SWITCH USING SUPPORT STRUCTURES WITH BOTH FIXED MIRRORS AND PIVOTABLE MIRRORS

TECHNICAL FIELD

The invention relates generally to optical switches and more particularly to optical cross-connected switches having micromirrors that are individually manipulated.

BACKGROUND ART

Continuing innovations in the field of fiberoptic technology have contributed to the increasing number of applications of optical fibers in various technologies. With the increased utilization of optical fibers, there is a need for efficient optical devices that assist in the transmission and the switching of optical signals. At present, there is a need for optical switches that direct light signals from an input optical fiber to any one of several output optical fibers, without converting the optical signal to an electrical signal.

The coupling of optical fibers by a switch may be executed using various methods. One method of interest involves employing a micromirror that is placed in the optical path of an input fiber to reflect optical signals from the input fiber to one of alternative output fibers. The input and output fibers can be either uni-directional or bidirectional fibers. In the simplest implementation of the mirror method, the input fiber is aligned with one of two output optical fibers, such that when the mirror is not placed in the optical path between the two fibers, the aligned fibers are in a communicating state. However, when the mirror is placed between the two aligned fibers, the mirror steers (i.e., reflects) optical signals from the input fiber to a second output fiber. The positioning of the mirror relative to the path of the input fiber can be accomplished by using an apparatus that mechanically moves the mirror. There are number of proposals to using micromachining technology to make optical signals. In general, the proposals fall into two categories: in-plane free-space switches and in-plane guided wave switches. Free-space optical switches are limited by the expansion of optical beams as they propagate through free space. For planar approaches, the optical path length scales linearly with the number of input fibers. Switches larger than 30×30 require large mirrors and beam diameters on the order of 1 millimeter (mm). For these planar approaches, the number (N) of input fibers scales linearly with the beam waist and the size of the optical components. Thus, the overall switch size grows as $N^2$. It is estimated that a 100×100 switch would require an area of 1 $m^2$, which would be a very large switch. Moreover, constraints such as optical alignment, mirror size, and actuator cost are likely to limit the switch to much smaller sizes. One planar approach claims that the optical switch can be designed so that it scales with the optical path difference, rather than the overall optical path. If this is possible, it would certainly allow larger switches. However, the optical path difference also scales linearly with the number of input fibers for a planar approach, so the switch grows very large as it is scaled to large fiber counts.

For guided wave approaches, beam expansion is not a problem. However, loss at each cross point and the difficulty of fabricating large guided wave devices are likely to limit the number of input fibers in such switches.

For both approaches, constraints such as loss, optical component size, and cost tend to increase with the number of fibers. There is a need for an optical cross connect switch which scales better with the number of input and output fibers. Some free-space optical systems can achieve better scaling. These systems make use of the fact that it is possible to use optical steering in two directions to increase the optical fiber count. Recently, optical switches that use such mirrors have been announced. The systems use piezoelectric elements or magnetically or electrostatically actuated micromirrors. The actuation method for these approaches is often imprecise. To achieve a variable switch, it is typically necessary to use a very high level of optical feedback.

U.S. Pat. No. 5,621,829 to Ford and U.S. Pat. Nos. 5,524,153 and 5,177,348 to Laor describe known optical switching systems. In one embodiment of the system of Ford, two prisms are connected to scan mechanisms that rotate the prisms. The system also includes a fixed mirror. Light from input fibers is redirected by the prisms and reflected by the fixed mirror to a particular output fiber. The rotations of the prisms determine the optical coupling from the input fibers to the output fibers. In an alternative embodiment, the function of the rotatable prisms and the fixed mirror is performed by a rotatable mirror. Thus, manipulation of the rotatable mirror determines the optical coupling between input and output fibers. With regard to the Laor system, a module of input fibers may contain fixed and movable mirrors for redirecting emitted optical signals. A concern is that the physical requirements of the mirrors presents a limitation on the center-to-center spacing of the optical fibers.

What is needed is an optical switch and a switching method that accommodate a high density of fibers without requiring exacting manufacturing tolerances in order to efficiently couple an input optical conductor to any one of a number of alternative output optical conductors.

SUMMARY OF THE INVENTION

An optical switch utilizes "composite mirrors" (i.e., support structures having individually addressable pivotable mirrors on one side and a fixed mirror arrangement on another side) in order to provide an easily scalable arrangement for efficiently coupling optical inputs to alternative optical outputs. In the preferred embodiment, separate composite mirrors are used in each reflection from an optical input to an optical output, with at least one fixed mirror and at least two pivotable mirrors defining the optical path. Manipulation of the first encountered pivotable mirror determines the target optical output, while manipulation of the second pivotable mirror provides the desired angle for achieving a low loss coupling to the target optical output.

While not critical, the optical inputs may be arranged in a number of discrete modules of input collimators, while the optical outputs may be arranged in a matching number of modules of output collimators. An optical beam which is emitted from a particular input collimator impinges a first fixed mirror that is angled so that the beam is directed toward a first micromirror that is mounted for rotation about two perpendicular axes. The first fixed mirror and the first dual axis micromirror are on separate composite mirrors. Manipulation of the first dual axis micromirror redirects the beam to a particular second dual axis micromirror that is dedicated to the target output collimator. The reflected beam from the second dual axis micromirror impinges a second fixed mirror, which redirects the beam to the target output collimator. Also in the preferred embodiment, the beam path from the first fixed mirror to the first micromirror is perpendicular to the face of the array of input collimators, while the beam path from the second micromirror to the second fixed mirror is perpendicular to the face of the array of output collimators. Thus, the fixed mirrors are positioned at 45° angles with respect to the associated modules.

In an alternative embodiment, the optical beams from input collimators reflect from a first dual axis micromirror before striking the first fixed mirror. As compared to the first embodiment, this embodiment has the disadvantage of increasing the module spacing, since the fixed mirror must be extended in length in order to accommodate the angular range of the optical beam. However, one advantage of this embodiment is that the micromirror size is not affected by the angle of the fixed mirror. For instance, a wedge-shaped spacer can be placed between the first fixed mirror and the first dual axis micromirror. This causes the angular range of the optical beams leaving the fixed mirror to be centered around a ray that is not normal to the input collimator from which the beam was emitted. This embodiment has the further benefit that the beam paths between the array of input collimators and the array of first dual axis micromirrors is reduced relative to the first embodiment, so that the mechanical alignment of the two structures is simplified.

In a third embodiment, the possible angular range of the optical beams is consistently centered on the middle of the opposing set of modules of collimators. In this embodiment, the module design is symmetrical about the center of the optical switch. An optical beam from one input array of collimators strikes a fixed mirror and travels away from the center of the optical switch to an associated dual axis micromirror. Preferably, the optical beam strikes the surface of the first micromirror at an angle that is perpendicular to the surface that supports the array of first dual axis micromirrors. For at least some of the composite mirrors, the arrays of micromirrors are rotated with respect to the fixed mirrors. A benefit of this embodiment is that the opposing collimator modules completely fill the field of view of each micromirror. A straightforward modification of this embodiment would be to orient the composite mirrors so that the beams travel toward the switch center (as opposed to traveling away from the switch center) after striking the first fixed mirror. This design has the benefit of reducing the optical path length, but has the disadvantage of orienting the micromirror arrays obliquely to the beam paths, thereby requiring larger micromirrors.

An advantage of the invention is that the fixed mirror on one side of a composite mirror folds the beam paths, so that the micromirror arrays can be placed very close to the collimator arrays. This ensures that most of the optical path length is between the two micromirror arrays. By combining each fixed mirror with a micromirror array into a single structure, the spacing between modules can be reduced. Thus, using the composite mirrors increases the maximum number of optical inputs and optical outputs for optical beams having fixed waists.

DETAILED DESCRIPTION

Figure 1:
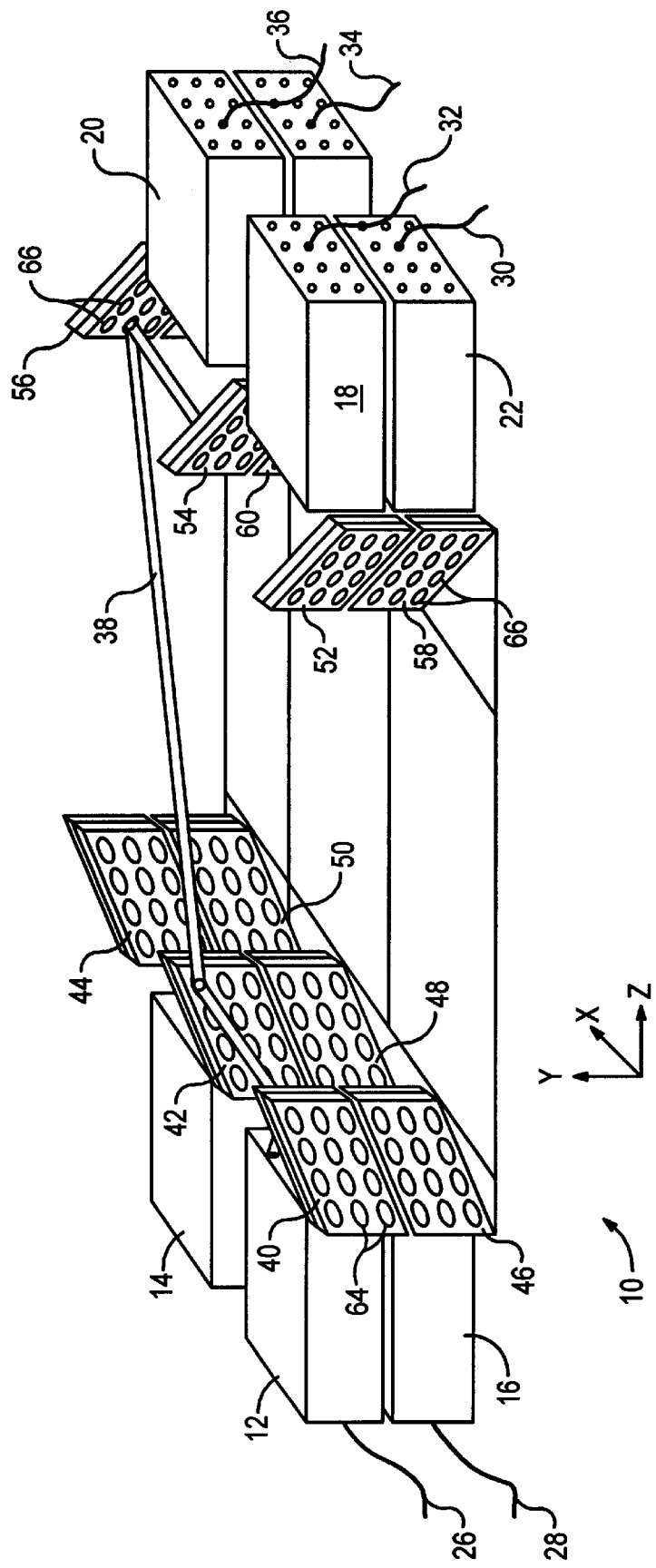
FIG. 1 is a perspective view of a first embodiment of an optical switch having composite mirrors in accordance with the invention.

With reference to FIG. 1, an optical switch 10 includes a number of modules 12, 14 and 16 of input collimators and a matching number of modules 18, 20, 22 and 24 of output collimators. In the perspective view of FIG. 1, only three of the input collimator modules are illustrated. The modules 12–16 will be described as comprising input conductors, and the modules 18–24 will be described as comprising output conductors. However, this is not critical. The individual optical conductors within the modules may be bidirectional elements, so that optical beams propagate in both directions. Moreover, the use of collimators is not critical if another means of controlling beam expansion can be substituted.

Each of the modules 12–24 includes a 4×3 array of collimators. A more conventional approach is to provide a 4×4 array, but the arrangement of collimators within a module is not critical. In operation, each collimator is connected to an optical fiber, such as input fibers 26 and 28 and output fibers 30, 32, 34 and 36. The function of the optical switch 10 is to allow an optical signal propagating along one of the input fibers 26 and 28 to be directed to any one of a number of output fibers 30–36. For example, in FIG. 1, an optical beam 38 is transferred from the input collimator associated with the fiber 26 to the output collimator associated with the fiber 36. While the collimator modules are shown as being connected to a single fiber, twelve fibers are coupled to each of the modules.

Optical coupling between an input fiber 26 and 28 and an output fiber 30–36 is achieved using composite mirrors 40, 42, 44, 46, 48, 50, 52, 54, 56, 58, 60 and 62. Each composite mirror has an array of multiple axis micromirrors on a first side and has a fixed mirror arrangement on a second side. The fixed mirror arrangement may be a continuous layer of a reflective material, such as gold. Alternatively, the fixed mirror arrangement may be an array of discrete reflective members. While the fixed mirror arrangement is typically planar, the arrangement may be configured to provide some optical manipulation, such as focusing.

The micromirrors 64 are pivoted about perpendicular axes. In FIG. 1, rotation of the micromirror that is first impinged by the optical beam 38 (i.e., the micromirror of composite mirror 42) will cause the optical beam to sweep across a horizontal row of micromirrors in the composite mirror 56, if the rotation is about the vertical axis (i.e., the y axis). On the other hand, rotation of the same micromirror about the horizontal axis will cause the optical beam 38 to sweep along a vertical column of micromirrors of the composite mirror 56. Preferably, the rotation about the y axis is sufficient to allow the optical beam 38 to be directed to the micromirrors of more than one of the composite mirrors. Examples of micromirrors that may be used in the invention will be described in detail below.

As is known in the art, optical collimators expand the beam from an input fiber 26 and 28 and provide some focusing. In the preferred embodiment of the invention, the minimum waist of an optical beam 38 is positioned approximately halfway between the set of input collimator modules 12–16 and the set of output collimator modules 18–24. Collimators which expand the beam to approximately 1 mm may be used. While the embodiment of FIG. 1 utilizes four input collimator modules, the number of modules is determined by the desired application, the angular range of the micromirrors 64, and the maximum optical path length.

After the collimator expands an optical beam from an optical fiber 26 and 28, the beam impinges on a first fixed mirror of one of the composite mirrors 40–62. The composite mirrors may be substrates having independently addressable micromirrors on a first side and a gold coating on a polished second side. The substrate may be a silicon die. The fixed mirror is preferably positioned at 45° relative to the face of the input collimator module 12 14 and 16, so that the optical beam reflects off the fixed mirror and travels parallel to the face of the module.

From the fixed mirror, the optical beam impinges on a first dual axis micromirror 64. Each of the micromirrors of the composite mirror 42 is dedicated to a single collimator of the module 12. Similarly, each micromirror of the composite mirror 44 is dedicated to one of the collimators of the input collimator module 14 and each micromirror of the composite mirror 48 is dedicated to one of the collimators of the input collimator module 16. Thus, each micromirror in an array of micromirrors steers an optical beam of its operatively associated collimator. A micromirror array is positioned at an approximately 45° angle with respect to its the associated collimator array. Thus, the portion of the optical path from the fixed mirror to the micromirror is parallel to the face of the module 12, while the portion of the optical path from the first micromirror to the second micromirror would be perpendicular to the face of the module when the micromirror is in a relaxed condition.

Properly positioning the first micromirror 64 steers the optical beam 38 onto a target second dual axis micromirror 66 of one of the composite mirrors 52–62. The target second micromirror 66 is dedicated to a particular output collimator module 18, 20, 22 and 24. Similar to the first micromirrors 64, the second micromirrors 66 within a particular array have a one-to-one correspondence with the collimators in the operatively associated output collimator module. The second micromirrors are actively positioned by rotation about the x axis and the y axis, so as to ensure that the optical beam 38 strikes the associated collimator at an angle such that there is a low loss coupling to the output optical fiber 30, 32, 34 and 36. For optimal coupling, the first and second micromirrors should be positioned so that the optical beam emitted from the input fiber 26 and 28 follows the same path that an optical beam would follow if it were emitted from the output fiber.

After reflecting from the second micromirror 66, the optical beam 38 travels approximately parallel to the face of the output collimator module 18, 20, 22 and 24. The optical beam then strikes a second fixed mirror that is on a side of a different composite mirror 52–62. The optical beam is redirected by the second fixed mirror to impinge on the target output collimator. As a result, the beam is propagated to the desired output fiber 30, 32, 34 and 36.

Figure 2:
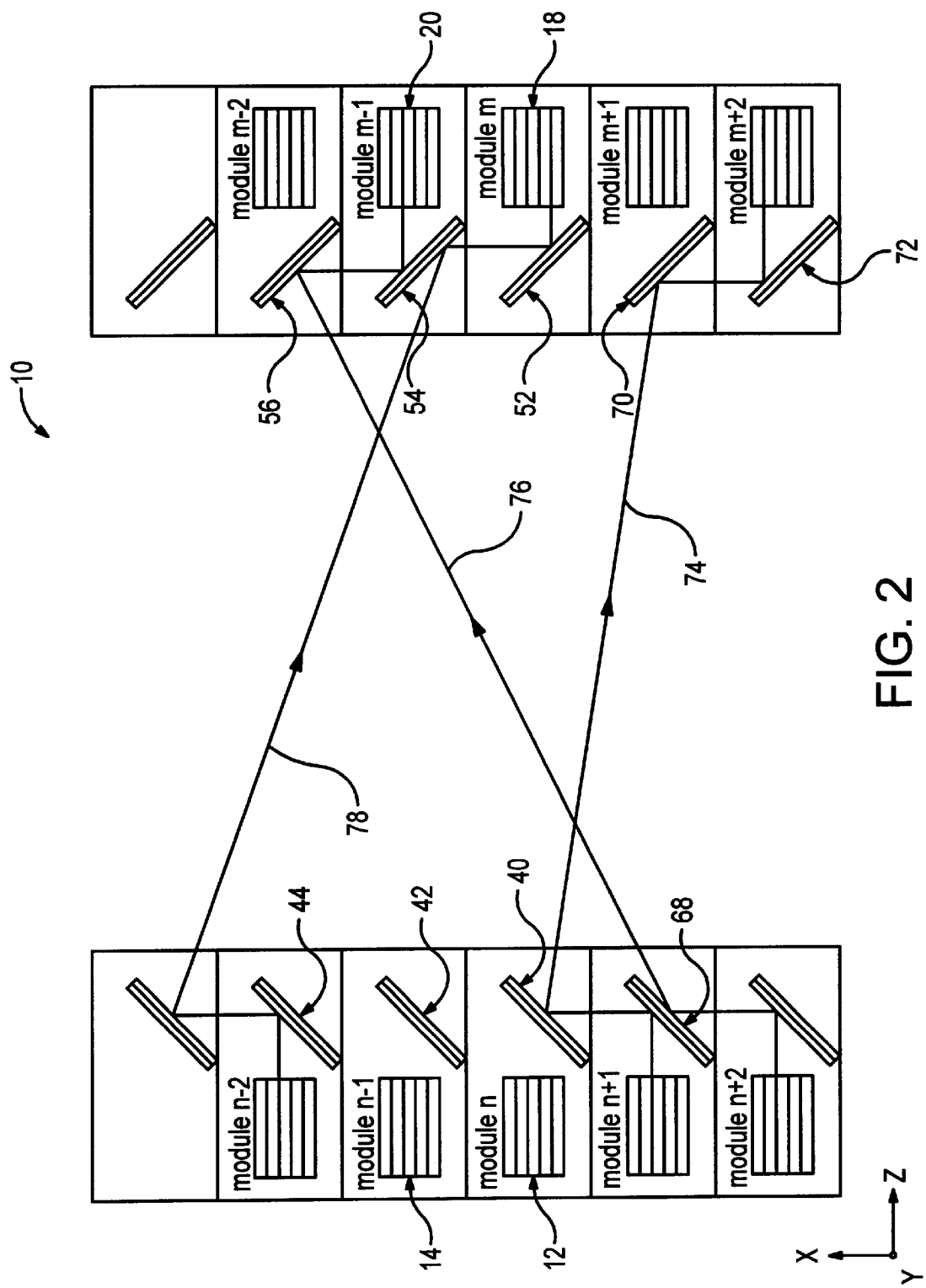
FIG. 2 is a top view of the optical switch of FIG. 1.

FIG. 2 is a top view of the optical switch 10 of FIG. 1, but with additional input collimator and output collimator modules. The four interior lines that extend horizontally within each of the different modules represent the collimators of the top row within the module. As described above, the optical beams from an input module, such as module n+1, are reflected by a fixed mirror of a first composite mirror 68, are steered by a first micromirror array of a second composite mirror 40, are precisely positioned by a second micromirror of a third composite mirror 70, and are reflected by a fixed mirror of a fourth composite mirror 72 in order to reach a target collimator of a target module, such as module m+2. This is the path followed by beam 74 in FIG. 2. Two other examples of propagations of optical beams 76 and 78 are included in the illustration.

By positioning the micromirror arrays directly in front of the neighboring collimator module, the modules can be tiled closely together. A key test for space efficiency in the packing of modules is to determine the percentage of the total viewing angle of each transmit (i.e., input) micromirror that is occupied by the receive (i.e., output) micromirrors. Ideally, an optical cross connect switch has as many input ports as are required for the particular application. Unfortunately, the maximum port count is fixed by the minimum waist of the optical beam, by the angular range of the micromirrors, by the packing density of the optical beams, and by the geometry of the optical switch. The composite mirrors described with reference to FIGS. 1 and 2 significantly improve the switch geometry, so as to allow a greater port count.

Figure 3:
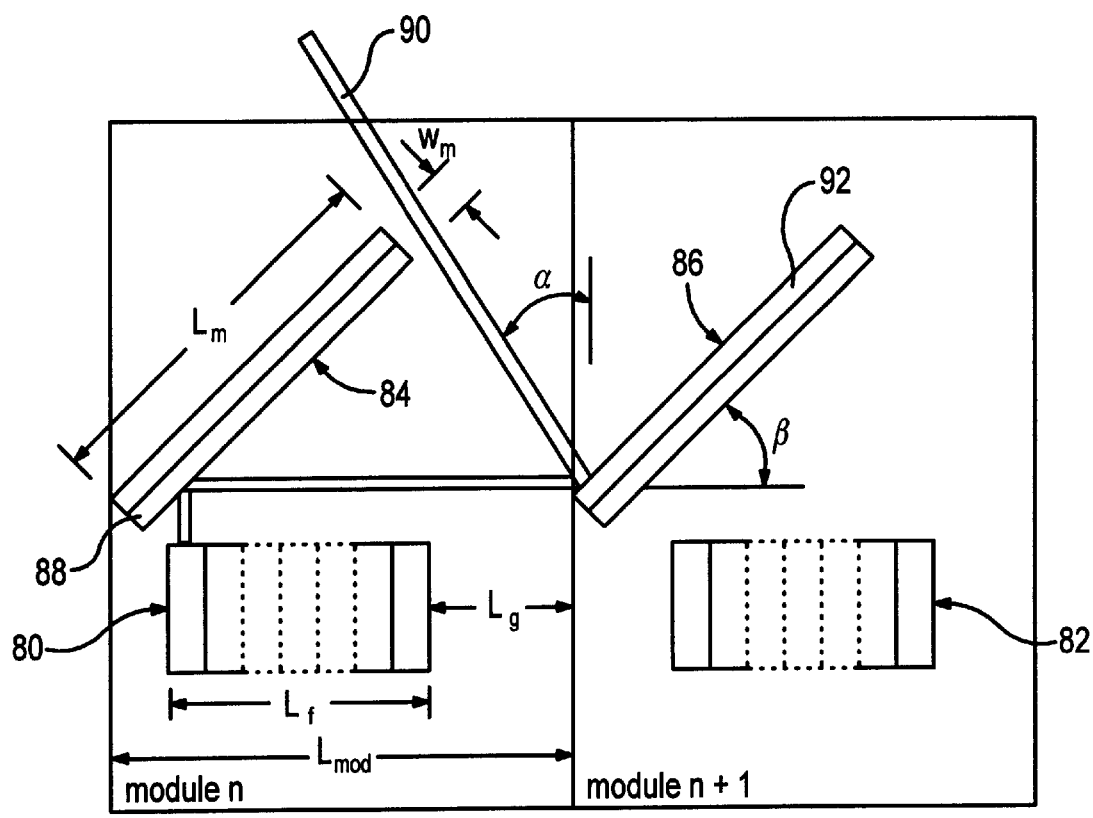
FIG. 3 is a top view of two of the collimator modules of FIG. 2.

FIG. 3 is a top view of a pair of input collimator arrays 80 and 82, along with designations of the geometries of elements. The geometries affect the overall port count of an optical switch formed according to the invention. The collimator array 80 is shown as having a length $L_f$. This length depends upon the number of the collimators and the pitch of the collimators within each row of the array. Unfortunately, the length $L_f$ is not equal to the total length $L_{mod}$ required for one of the collimator arrays and its associated composite mirror 84 and 86. Additional space is required to account for two effects. First, the collimator arrays 80 and 82 must be spaced far enough apart to accommodate the width $W_m$ of the composite mirrors 84 and 86. Second, the neighboring composite mirrors 84 and 86 must be spaced far enough apart to ensure that the fixed mirror 88 does not interfere with the optical beam 90 from the arrayed micromirrors 92. The additional length $L_g$ is a function of the angle α that the optical beam is tilted, the overall length $L_m$ of the composite mirror, and the angle β that the composite mirror forms with respect to the plane parallel to the face of the collimator array.

Figure 4:
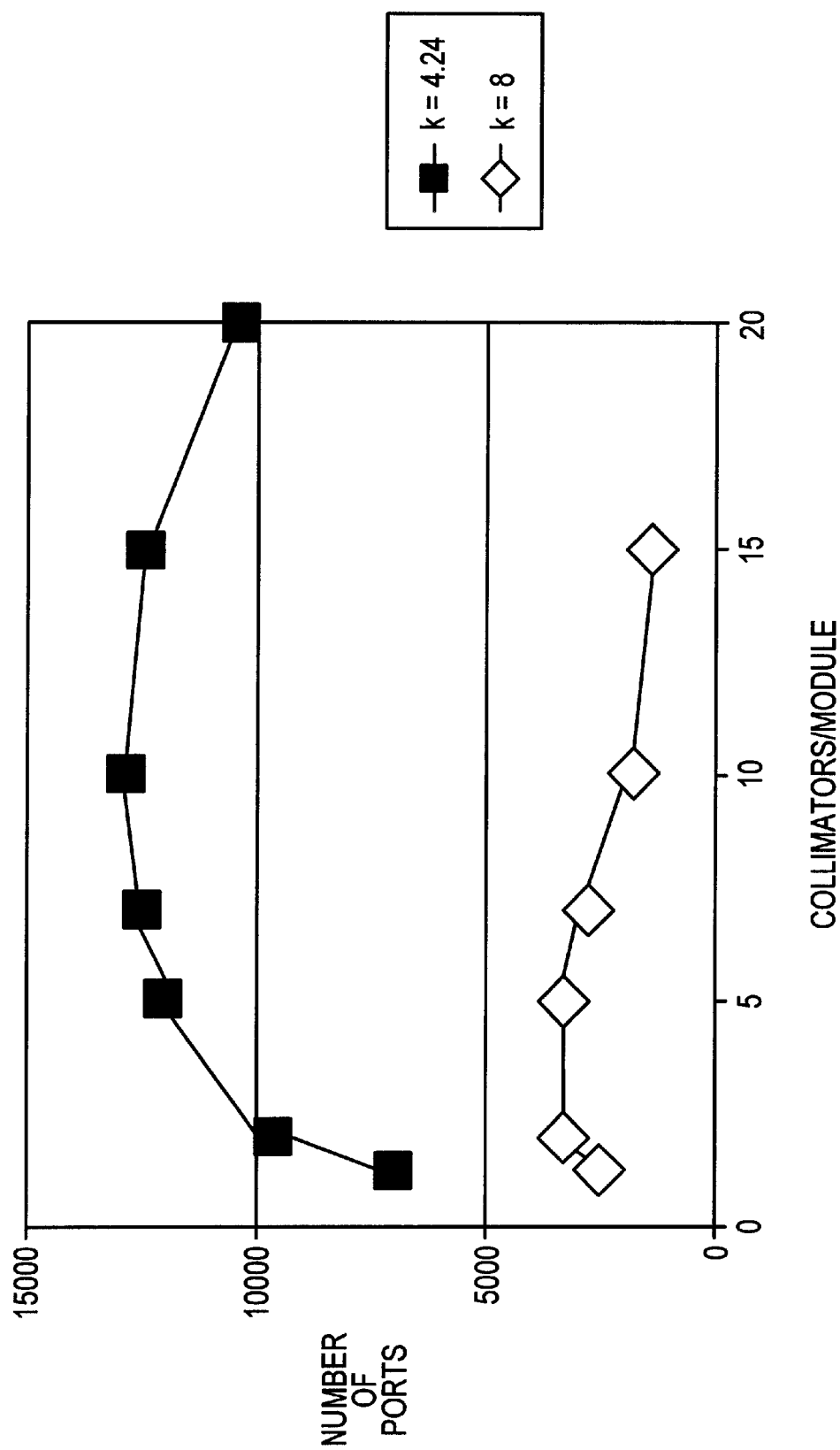
FIG. 4 shows plots of two cross connect sizes as a function of the number of collimators in each collimator module.

FIG. 4 is a plot of the total number of input and output ports that may be included by following the geometry of FIG. 3. The port count is plotted as a function of the number of collimators per module. The overall port count only depends on the number of collimators in each module in the horizontal direction. This plot uses the following assumptions: (1) the maximum beam waist is 0.5 mm, (2) the thickness of the composite mirror ($W_m$) is 3 mm, and (3) the micromirrors have a rotational range of ten degrees in each direction from center. A spacing factor (k) defines the distance between nearest neighbor beams relative to the minimum beam waist. The spacing factor k=8 corresponds to the spacing that would occur if off-the-shelf GRIN lenses were used to collimate the beams, while the spacing factor k=4.24 corresponds to collimator and mirror sizes that are three times the beam waist at the collimator.

FIG. 4 illustrates a number of relevant characteristics. Most notably, there is a range of module sizes which allow the largest port count. For large spacings between the optical beams (k=8), switch sizes of over 3000×3000 can be achieved with modules that are between two and seven collimators wide. This geometry allows a three-fold increase in the port count relative to the, geometry shown in FIG. 1. The plots of FIG. 4 also show the importance of packing the beams as close as possible. By reducing the beam spacing to three times the largest waist or approximately 4.2 times the minimum waist, 11000×11000 port switches appear possible. It also appears that it would be better to use modules that are five to fifteen collimators wide in this case. However, it should be noted that the plots of FIG. 4 are only meant to be approximations and that the plots are dependent on the width of the composite mirrors, the angular range of the micromirrors, and the switch geometry.

Figure 5:
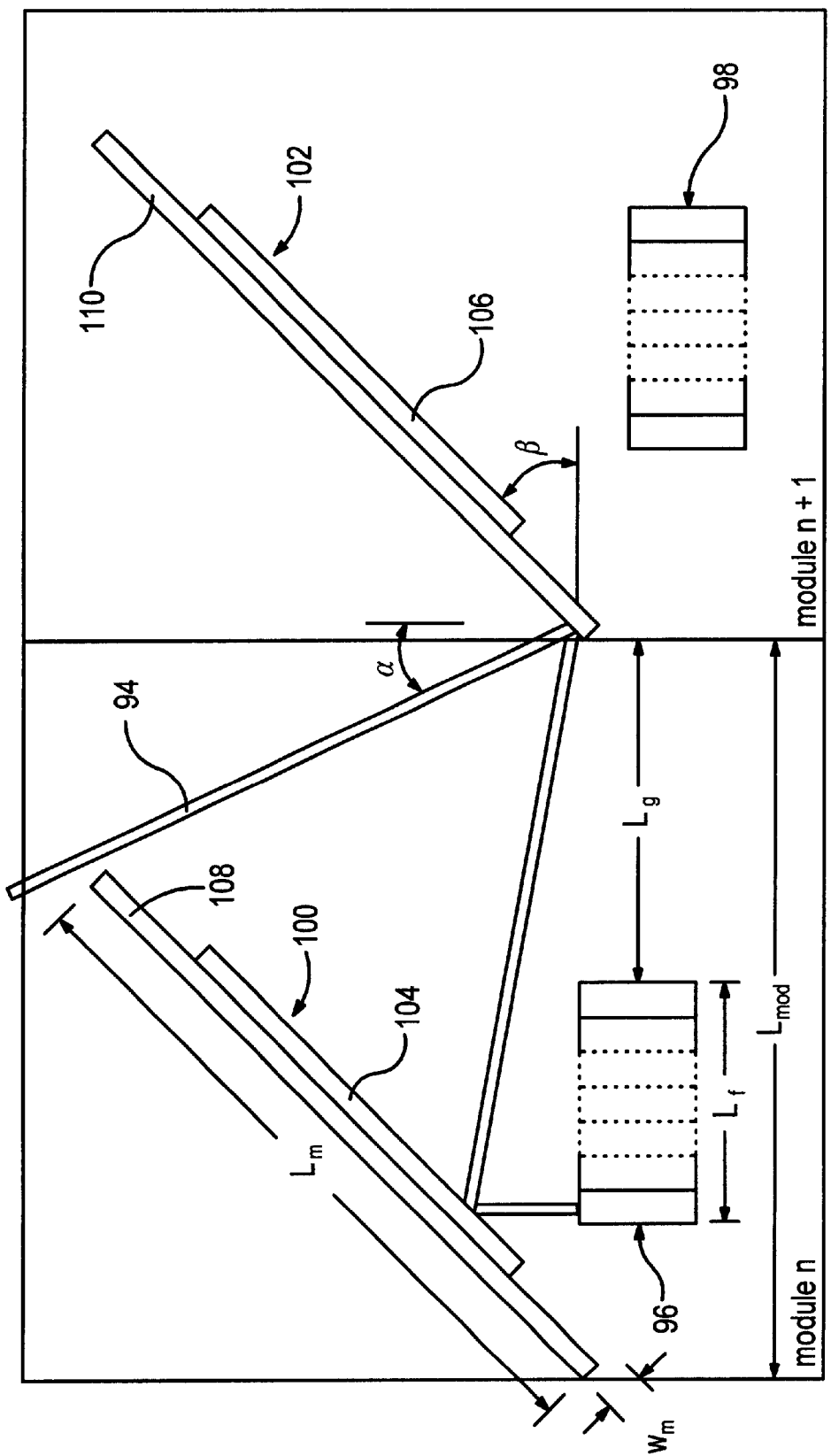
FIG. 5 is a top view of two neighboring input collimator modules in accordance with a second embodiment of the invention.

FIG. 5 illustrates an alternative embodiment. In this embodiment, an optical beam 94 from a collimator module 96 and 98 impinges a micromirror, prior to being reflected by a fixed mirror. Thus, for each of the composite mirrors, 100 and 102 shown in FIG. 5, the micromirror array 104 and 106 is adjacent to the associated array of collimators, while the fixed mirrors 108 and 110 are on the backsides, relative to the input collimators. The advantage of this architecture is that the beam path between the collimators and the micromirrors is reduced, as compared to the embodiment described above. This simplifies the mechanical alignment of the two structures. Another benefit is that the micromirror size is not affected by the angle of the fixed mirror. Thus, a wedge-shaped spacer can be placed between the fixed mirror 108 and the micromirror array 104. This would cause the angular range of the optical beams 94 leaving the fixed mirrors 108 and 110 to be centered around a ray that is not normal to the collimator array. On the other hand, a disadvantage of the embodiment of FIG. 5 is that the overall length $L_{mod}$ is increased, since the fixed mirrors 108 and 110 must be lengthened in order to accommodate the angular range of the optical beam.

Figure 6:
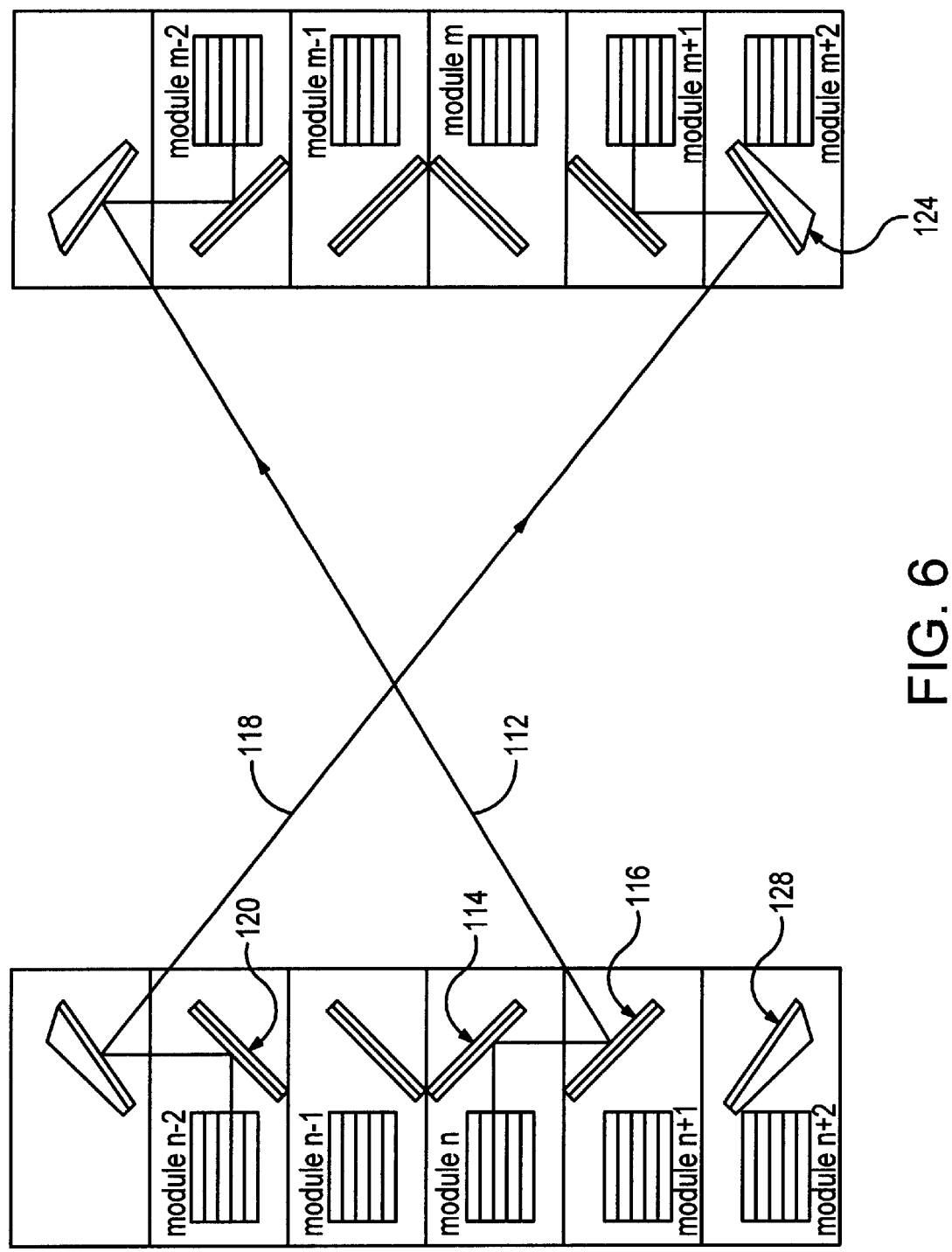
FIG. 6 is a top view of an optical switch in accordance with a third embodiment of the invention.

Another embodiment of the invention is shown in FIG. 6. In this embodiment, the module design is symmetrical about the center of the optical switch. As a result, an optical beam from an input collimator will strike the fixed mirror and travel away from the switch center. For example, the optical beam 112 strikes a fixed mirror of a first composite mirror 114 and is directed downwardly (as viewed in the orientation of FIG. 6) to a micromirror of a second composite mirror 116. On the other hand, the optical beam 118 is reflected upwardly (as viewed in the orientation of FIG. 6) by a fixed mirror of a composite mirror 120 to a micromirror of another composite mirror 122. In contrast to the reflection at the input side of the optical switch, the reflection at the output side directs the beams 112 and 118 toward the switch center. Thus, the micromirrors of the composite mirrors 124 and 126 reflect the beams 112 and 118 toward the center of the set of output modules. An advantage of the embodiment of FIG. 6 is that the optical beams tend to strike the surfaces of micromirror arrays at an angle normal to the array surface. A straightforward modification of the design would be to orient the composite mirrors so that the beams travel toward the switch center at the input side and away from the switch center at the output side after being reflected. This modification would have the benefit of reducing the optical path length. However, the disadvantage is that the micromirror arrays would be oriented obliquely to the beam paths, thereby requiring larger micromirrors.

Figure 7:
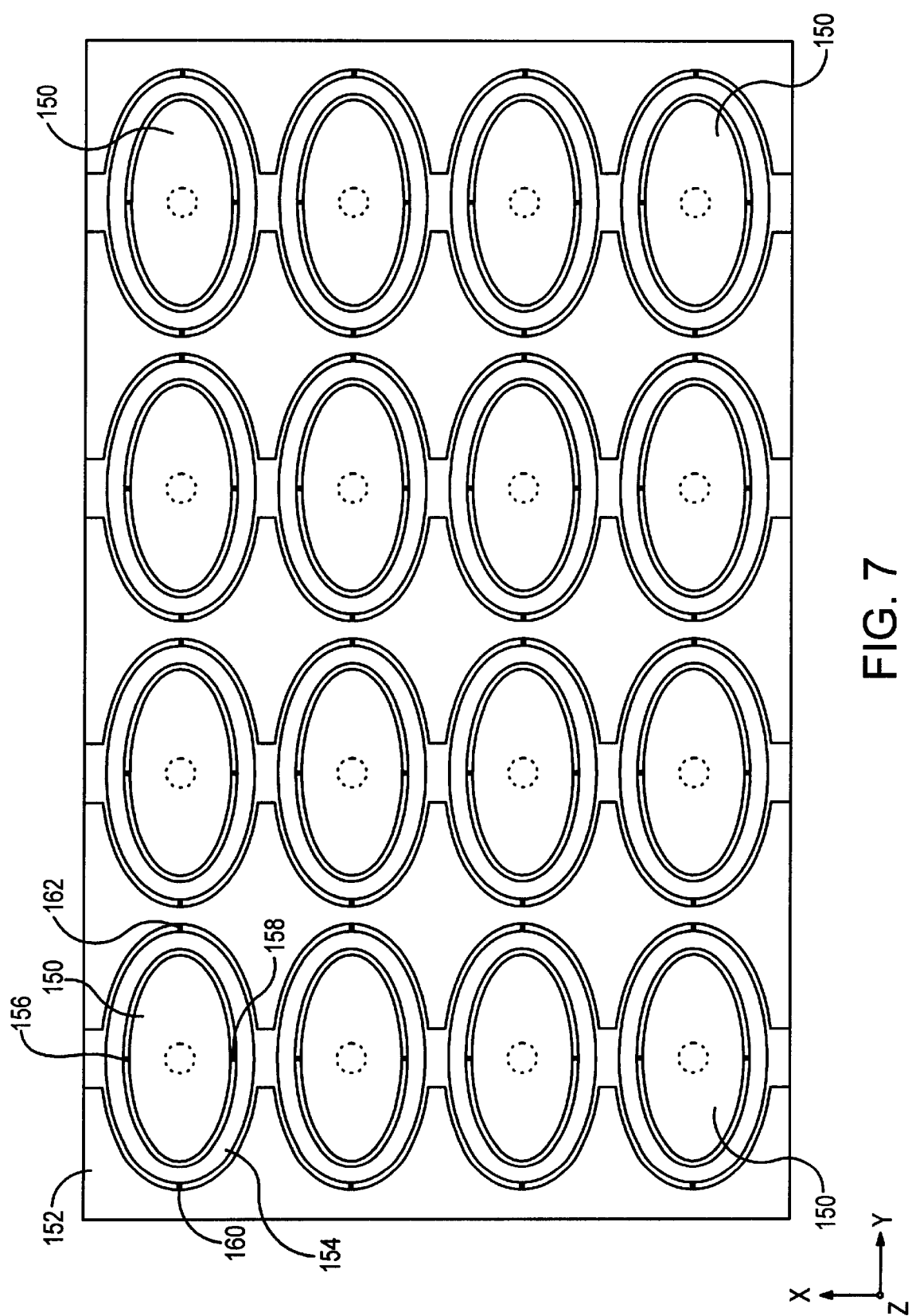
FIG. 7 is a top view of an example of a micromirror array that may be used with the present invention.
Figure 8:
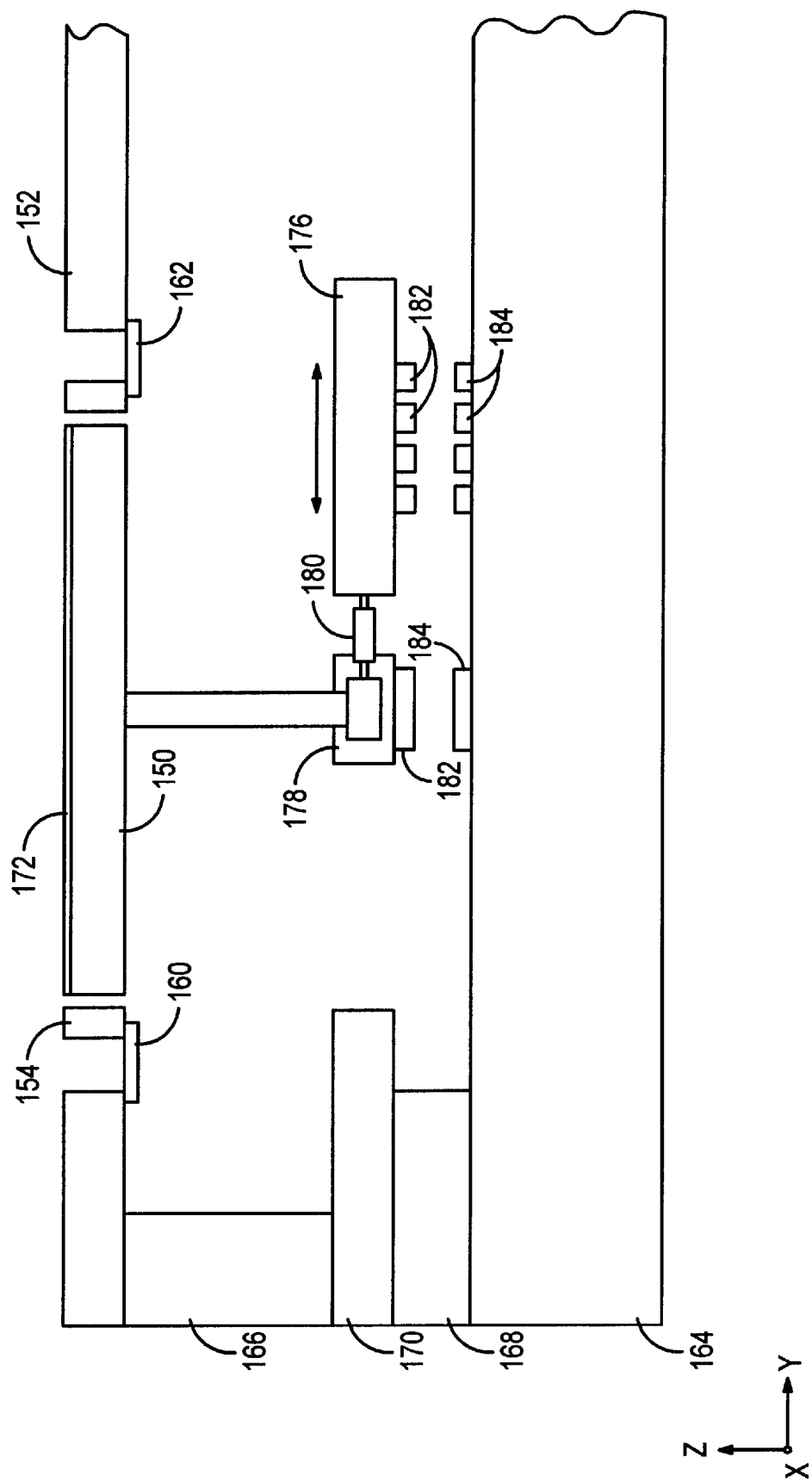
FIG. 8 is a side view of one of the micromirrors of FIG. 7 connected to a mover substrate having actuators for manipulating the micromirror about two axes.
Figure 9:
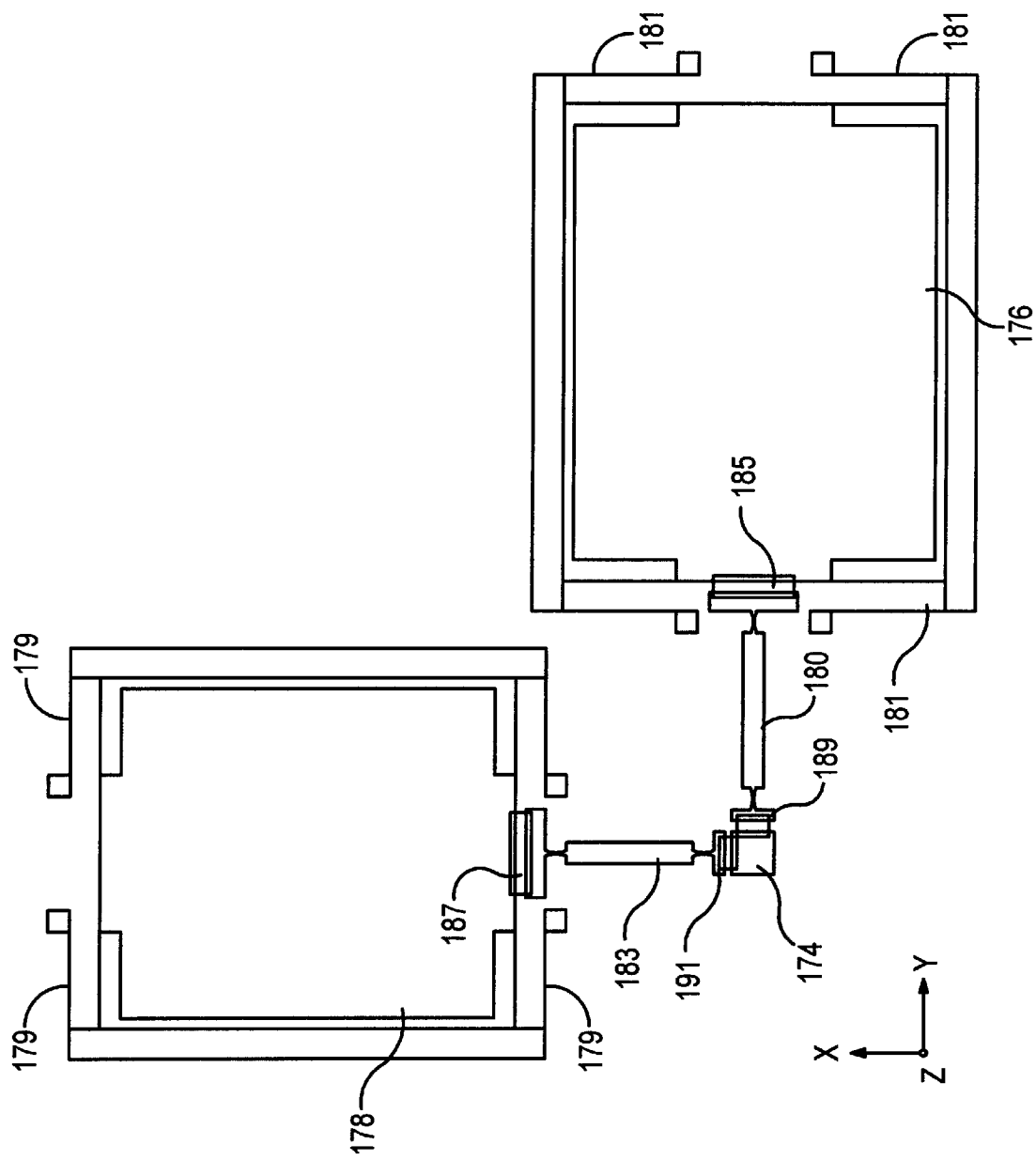
FIG. 9 is a top view that isolates the pair of actuators for manipulating the micromirror of FIG. 8.

In FIG. 6, any one of the micromirror arrays on the input side may redirect beams to any one of the micromirror arrays on the output side. In general, the micromirror arrays in the center of the switch, such as composite mirrors 114 and 116 in FIG. 6 or composite mirrors 40 and 42 in FIG. 2, should be oriented so that when a micromirror is positioned in the middle of its range of travel, the optical beam associated with that micromirror is directed toward the center of the array of output modules. If the angles of all of the micromirror arrays are identical, as in the embodiment shown in FIG. 2, the optical beam associated with a micromirror far from the center of the switch is not directed at the center of the array of output modules. Assuming that middle of the micromirror travel occurs when the micromirror is parallel to the surface of the supporting composite mirror, the optical beam from an input module n−2 is directed toward output optical module m−2, rather than output module m. Half of the angular range is inconsequential for each micromirror that is far from the center, since the optical beam from such a micromirror is directed outside of the area of the output array for as much as fifty percent of the micromirror rotation angles. In contrast, the embodiment shown in FIG. 6 allows the full range of motion of each micromirror to be used. Composite mirrors 122 and 128 are rotated with respect to the other composite mirrors. In this fashion, the optical beam is reflected from a micromirror of the end composite micromirrors 122 and 128 toward the center of the output side when that micromirror is in the center of its range of travel. Similarly, the output composite mirrors 124 and 126 at the opposite ends of the center are rotated with respect to the same-side composite mirrors. The composite mirrors 122, 124, 126 and 128 are shown as including wedge-shaped spacers between the fixed mirror side and the dual axis micromirror side. One concern with the arrangement of FIG. 6 is that the micromirror size and spacing may need to be changed near the edges of the optical switch, since the micromirror array is no longer oriented at 45° with respect to the optical beams coming from the fixed mirrors. However, as noted above, interchanging the order of the fixed mirrors and the micromirror arrays would ensure that the spacing of the micromirrors could remain the same for all modules Examples of Micromirror Designs FIG. 7 is a top view of one example of an array of sixteen micromirrors 150 formed on a micromirror substrate 152. FIG. 8 is a side view of one of the micromirrors and the mechanism for manipulating the rotations of the micromirror. FIG. 9 is a top view of the mechanism for manipulating the micromirror rotations. Referring first to FIG. 7, each micromirror is coupled to a ring member 154 by first and second torsion bars 156 and 158. The positions of the torsion bars define the first axis of rotation of the mirror 150. In the orientation of FIG. 7, the first axis is a x axis. The ring member 154 is coupled to the substrate 152 by third and fourth torsion bars 160 and 162, which define the second axis (i.e., the y axis). Only the third and fourth torsion bars are visible in the side view of FIG. 8.

The torsion bars 156, 158, 160 and 162 are thin membrane flexures which are used to connect separate elements. Suitable materials for the twisting flexures would be silicon nitride, polysilicon, or single crystal silicon. The thickness of the flexures may be as small as approximately 1000 Å or as large as 100 μm. The particular choice of thickness depends on the required switching time. Silicon nitride films and polysilicon films are believed to have excellent resistance to cyclic fatigue. Because the torsion bars are only twisted within the elastic limits of the material, a particular movement by the actuators to be described below produces the same mirror position. When the torsion bars are in the relaxed condition, the micromirror 150 lies parallel to the fixed portion of the micromirror substrate 152.

In FIG. 8, it can be seen that the micromirror substrate 152 is coupled to a mover substrate 164. The means for coupling the two substrates is not critical to the invention. In FIG. 8, a silicon beam 166 is connected to a pair of intermediate layers 168 and 170. However, other mechanisms for attaching the substrates may be employed. The mirror 150 may have a thickness of approximately 100 microns. As previously noted, the mirror curvature is a significant concern because the beam path lengths are relatively long. For the 1000×1000 switch, the mirror radius of curvature needs to be greater than 11 m. Such a large radius of curvature is readily achievable because the mirror is relatively thick and is primarily comprised of single crystal silicon. A thin metal layer 172 is coated on the exposed surface of the silicon micromirror 150 to achieve the desired reflective properties. An acceptable metal is a gold film 172 having a maximum thickness of 2000 Å, so that the gold stress can be limited to less than 150 MPa for the mirror to have a curvature greater than 11 m. This stress control is straightforward when using many of the known deposition and annealing methods.

Extending downwardly from the mirror 150 is a projection 174. The use of the projection allows the micromirror to be manipulated in the same manner as a joystick-controlled device. That is, pressure applied to the projection 174 will cause rotation of the micromirror 150. The extent of rotation and the axis of rotation will depend upon the degree of movement and the direction of movement of the projection 174. A pair of movers 176 and 178 are used to control the movement of the projection 174. The mover 176 is shown as being coupled to the projection by a connector rod 180 that allows the projection to rotate as the mover is displaced linearly.

Actuating the mover 176 causes the micromirror 150 to rotate relative to the ring member 154 and the micromirror substrate 152. In FIG. 7, the rotation will be about the x axis defined by the torsion bars 156 and 158. The second mover 178 is electrostatically driven to displace the mover into and out of the illustration of FIG. 8. Thus, the displacement of the second mover 178 causes rotation of the ring member 154 (and consequently the micromirror 150) about the y axis defined by the torsion bars 160 and 162.

The motor used to rotate the micromirror 150 about one of the axes consists of two elements, a stator and a translator. In the embodiment of FIG. 8, the stator is the mover substrate 164 and there are two translators, i.e., the movers 176 and 178. However, a single mover may be used in some applications. For example, the end of the projection 174 may be coupled to a single mover that is electrostatically actuated to provide motion in either of two directions. The motor is described herein as a surface electrostatic actuator because the motion is parallel to the surfaces of the two elements and the force is generated by voltages applied to these surfaces. Surface electrostatic actuators are also described in U.S. Pat. No. 5,986,381 to Hoen et al., which is assigned to the assignee of the present invention.

FIG. 9 shows a top view of the two movers 176 and 178 and the means for connecting the movers to the projection 174. The movers are suspended above the surface of the mover substrate (not shown in FIG. 9) by ending beam flexures which allow the movers to be shifted 100 μm in the desired direction of travel, but which contain the movers from movement in other directions. Each of the connector rods 180 and 183 must be stiff with respect to displacements along to the associated desired axis of travel, yet must be compliant to displacements that are normal to the desired axis of travel. For example, the connector rod 180 that is connected to the mover 176 must couple the displacements of the mover 176 directly to the projection 174, while accommodating both the displacements caused by the actuation of the second mover 178 and the tilt of the projection 174 which occurs as it is displaced. The connector rods 180 and 183 of FIG. 9 are linked to the movers 176 and 178 by first thin bending elements 185 and 187. Similarly, the connector rods are linked to the ends of the projection 174 by second thin bending elements 189 and 191. These bending elements accommodate some of the tilt of the projection. In addition, a region of each connecting mechanism is thinned so that it is relatively soft with respect to displacements initiated by actuation of the mover with which it is not associated. This thinned region is also relatively soft with respect to torsions, so that rotations of the projection can be accommodated.

The lower surfaces of the movers 176 and 178 include sets of electrodes 182. The sets of electrodes are generally aligned with sets of electrodes 184 along the surface of the substrate 164. By manipulating the voltage pattern of one of the two sets of electrodes associated with a mover, the mover can be actuated.

Figure 10:
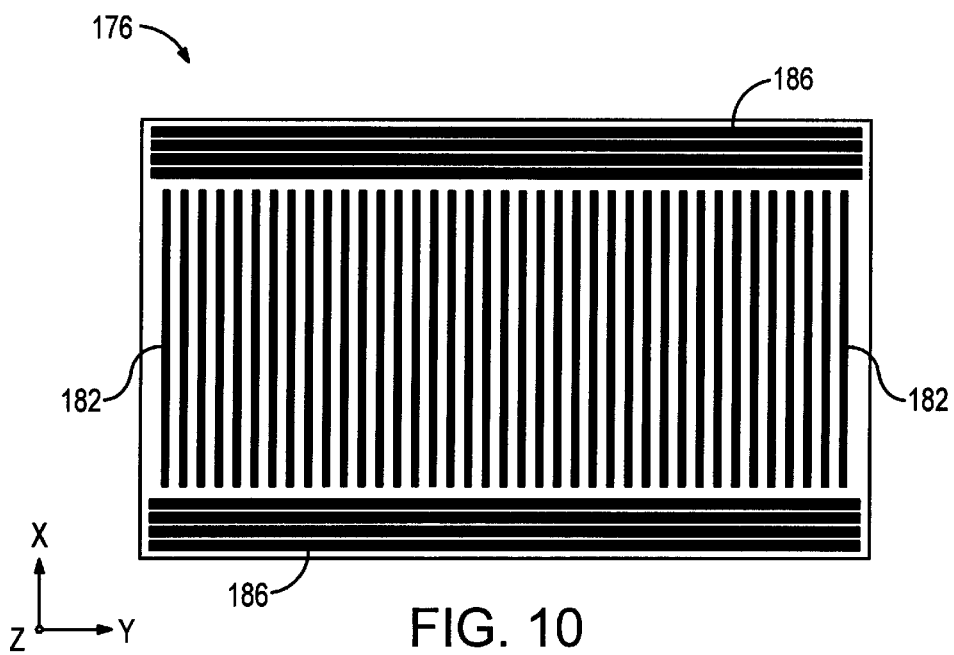
FIG. 10 is a bottom view of a mover of FIG. 8, showing vertically oriented driver electrodes and horizontally oriented levitator electrodes.

One embodiment of a pattern of electrodes on a mover 176 or 178 is shown in FIG. 10. The lower surface of the mover has two distinct sets of electrodes. In the orientation of FIG. 10, the drive electrodes 182 are shown as extending parallel to the x axis, while levitator electrodes 186 extend parallel to the y axis. Similar sets of electrodes are patterned in the corresponding areas of the mover substrate 164. The drive electrodes 182 are aligned perpendicular to the direction of travel and are used to position the mover in the direction of travel. When appropriate voltage patterns are applied to these drive electrodes, the electrodes create a set of potential wells that are periodic in the mover position.

Figure 11:
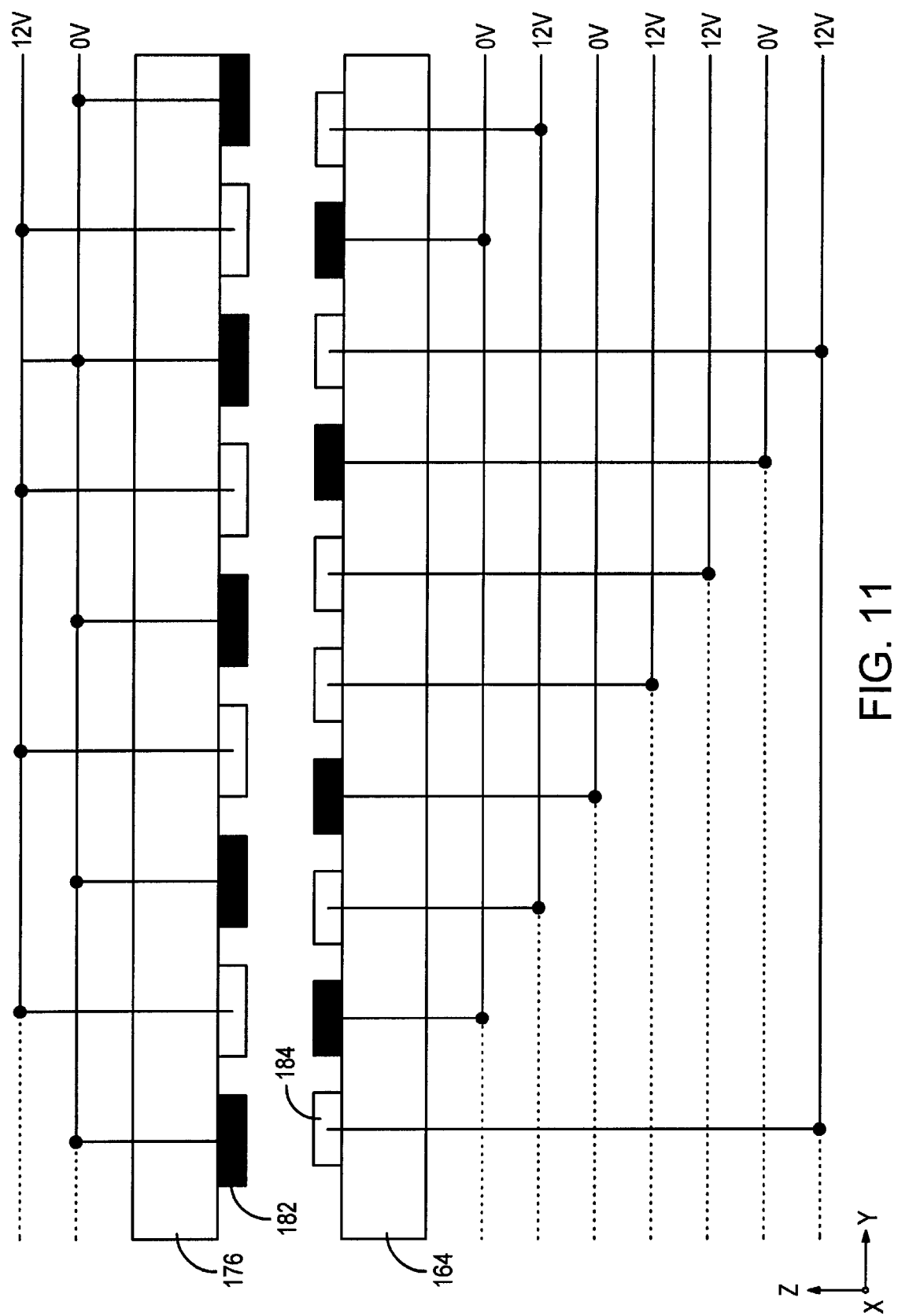
FIG. 11 is a side view of the mover and mover substrate of FIG. 8, showing voltage patterns along the drive electrodes at one particular time.

One voltage pattern for the drive electrodes is shown in FIG. 11. The electrodes are configured such that, for each six drive electrodes 182 on the mover 176, there are seven drive electrodes 184 along the substrate 164. The mover electrodes have a spatially alternating pattern of applied voltages. That is, if a given electrode is held at 12 V, then the nearest neighbor electrodes are held at 0 V. This pattern is repeated along the lower surface of the mover. A similar voltage pattern is applied to the substrate electrodes 184. However, the substrate voltage pattern contains a single disruption, i.e., a location where the alternating pattern breaks down. This disruption occurs once per every seven electrodes in this particular embodiment, but other arrangements may be substituted. To displace the mover 176, these disruptions are moved in one direction or the other. In FIG.

11, the disruption is formed by a central pair of electrodes that are both biased at 12 V. To move the disruption to the right, the electrode that is on the right in the central pair is switched from 12 V to 0 V. The disruption would now be formed by a pair of adjacent electrodes that are both biased at 0 V. In a similar fashion, the disruption can be successively moved to the right. Moving the disruption to the right causes the mover to be displaced to the left. The displacement step size is determined both by the electrode pitch along the mover and by the number of, substrate electrodes in one group. Specifically, the displacement step size is the mover electrode pitch divided by the number of substrate electrodes in a group. For instance, if the mover pitch is 1 micron, switching the voltage pattern shown in FIG. 11 causes the translator to move by 0.143 microns.

An additional feature of this electrostatic drive is that the mover position depends linearly on the relative voltage applied to the disrupted electrode. For instance, if 35% of the drive voltage is applied to the disrupted electrode, then the translator moves 35% of the full step distance, or 50 nm in this case. It should be noted that changing the drive voltage uniformly for each electrode 182 and 184 does not change the position of the mover, since it merely changes the amount of force that the mover can apply. A second feature of this drive configuration is that it produces a very large force for a given voltage. The maximum force that can be applied by electrostatics is the force of attraction between two plates of a capacitor, i.e., $F_{cap} = -\epsilon_0 AV^2/(2d^2)$, where A is the surface area of the capacitor and d is the spacing between the plates. The force applied by this motor is ~25% of this maximum force and is applied laterally.

Figure 12:
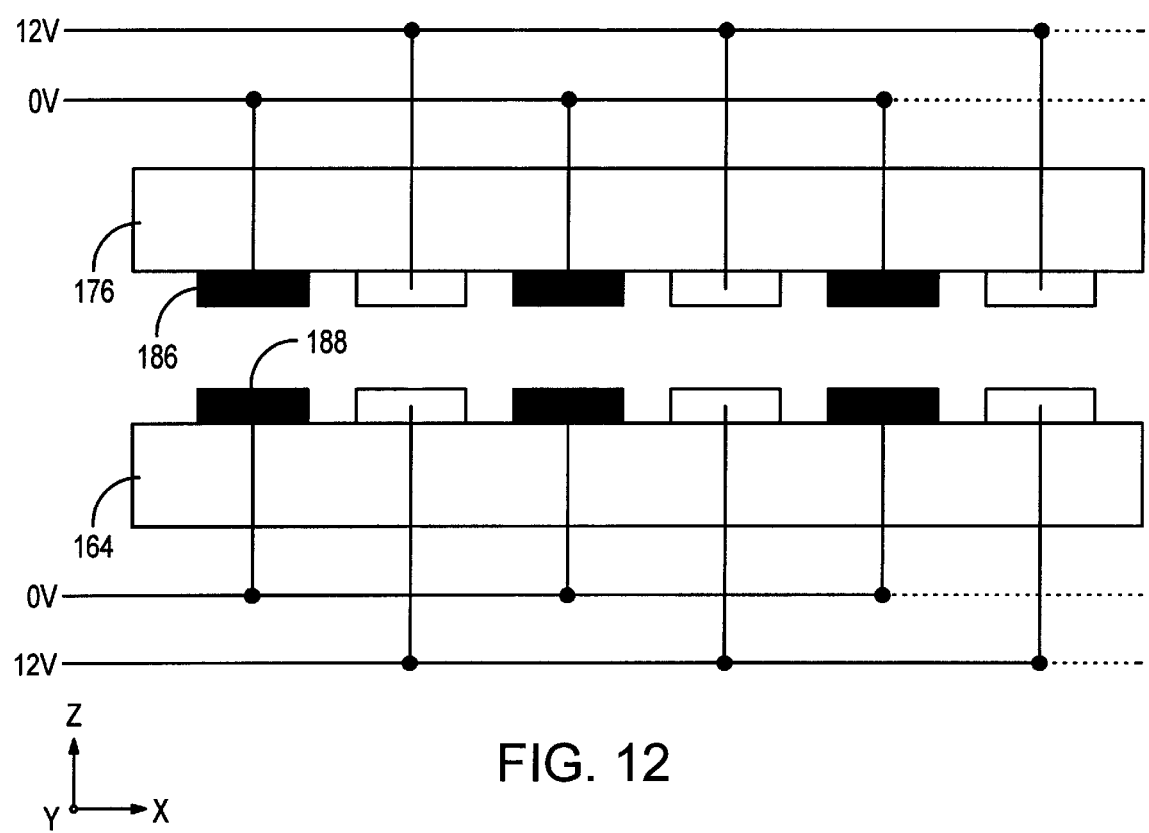
FIG. 12 is an end view of one arrangement of levitator electrodes on a mover and mover substrate of FIG. 8, showing possible voltage patterns along the levitator electrodes.

When energized, the drive electrodes 182 and 184 also apply a significant force of attraction between the mover 176 and the mover substrate 164. This attractive force would limit the range of travel if the drive electrodes were the only electrostatic element, because there is a narrow range of attractive forces for which the supporting flexures are stable. As previously noted, the mover 176 is preferably supported above the substrate 164 by flexures. Adding levitator (repulsive) electrodes to the system counteracts the attractive forces and allows a much greater range of motion and much greater lateral forces. One configuration of the levitator electrodes is shown in FIGS. 10 and 12. The levitator electrode pitch on the rotor (i.e., the mover 176) is identical to the levitator electrode pitch on the stator (i.e., the substrate 164). Voltage patterns are applied to both the rotor electrodes 186 and the stator electrodes (not shown), so that the biased electrodes on the rotor are positioned directly opposite to the biased electrodes on the stator. Similarly, the grounded electrodes on the two surfaces are positioned directly opposite to each other. By selecting the appropriate electrode voltages and electrode spacings, it is possible to generate a repulsive force between the two elements 164 and 176 by electrostatic voltages. This effect occurs because of the fringing fields between the electrodes. The levitator electrodes shown in FIGS. 10 and 12 generate as much as 30% of the maximum force generated by a similarly sized capacitor, and in this case, the force pushes the two elements directly apart. The levitator electrodes are aligned parallel to the direction of travel by the mover 176. Thus, the force that they apply is constant as the mover is displaced laterally.

FIGS. 13–16 illustrate another example of a micromirror design that can be used with the invention. In this embodiment, one side of a micromirror 190 is supported relative to a substrate 192 by a frame 194. The structure of the micromirror may be identical to that described above. That is, the micromirror may be formed of single crystal silicon having a thickness of approximately 100 microns, with a thin coating (e.g., 2000 Å) of reflective material, such as gold. The micromirror is a dual axis device. The embodiment includes two movers 196 and 198 which move in parallel directions. However, other embodiments are contemplated. For example, the movers may be connected to the micromirror 190 such that the micromirrors follow perpendicular paths. In another embodiment, there is a single mover that can be displaced in perpendicular directions, depending upon the applications of electrostatic forces.

Each mover 196 and 198 is supported above the substrate 192 by three beam flexures 200, 202 and 204. Each beam flexure has an E shape, with end legs that are fixed to the substrate and a center leg that is fixed to the associated mover. The flexures may have a thickness of 2 μm and a depth of 100 μm.

Figure 13:
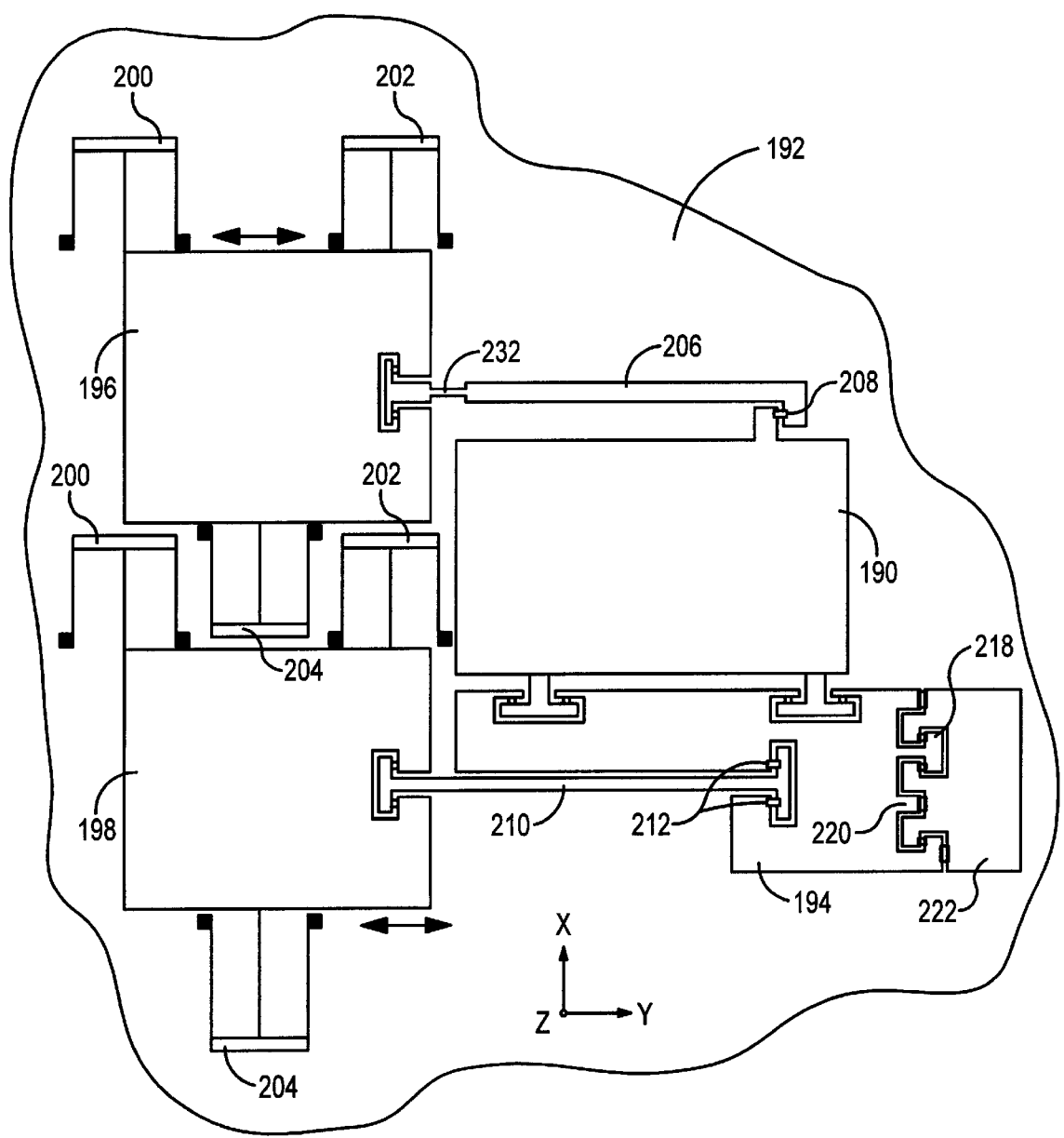
FIG. 13 is a top view of a micromachine having electrostatically driven motors which manipulate a micromirror about two axes.
Figure 14:
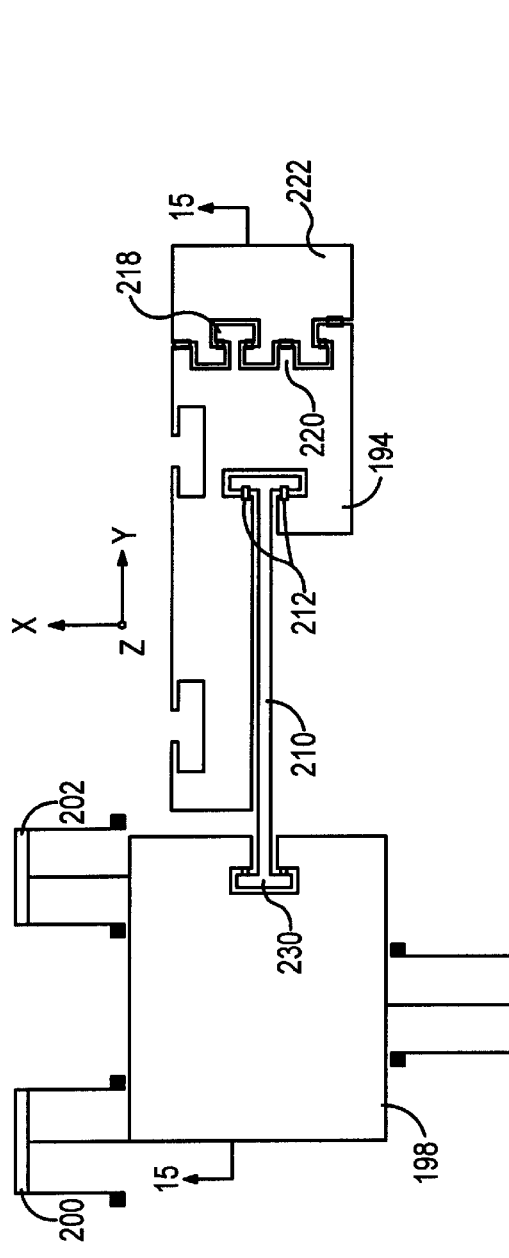
FIG. 14 is a top view of one of the movers and a frame of the micromachine of FIG. 13.

The mover 196 is coupled to the micromirror 190 by a mirror drive rod 206 and a thin membrane flexure 208. Similarly, the mover 198 is connected to the frame 194 by a frame drive rod 210 and a pair of thin membrane flexures 212. The thin membrane flexures 208 and 212 are substantially identical to the torsion bars 156, 158, 160 and 162 described with reference to the embodiment of FIG. 7. The membrane flexures are formed on the upper surfaces of the rods 206 and 210. While not clearly shown in FIG. 13, additional membrane flexures are formed along the lower surfaces of the movers to attach the movers to the drive rods 206 and 210. Again, the material may be silicon nitride or polysilicon having a film thickness of approximately 1000 Å. The interlocking pattern of a hinge that connects the frame 194 to a support member 222, as shown in FIGS. 13 and 14, allows the hinge to be loaded in both compression and tension. That is, forces can be applied to the two sides of the hinge which tend to pull the two sides of the hinge apart, and forces can be applied to the hinge which tend to push the two sides of the hinge together. The illustrated hinge includes a T-shaped protrusion element 218 that operates well when the hinge is loaded under compression and includes a second protrusion element 220 that operates well when the hinge is loaded under tension.

Figure 15:
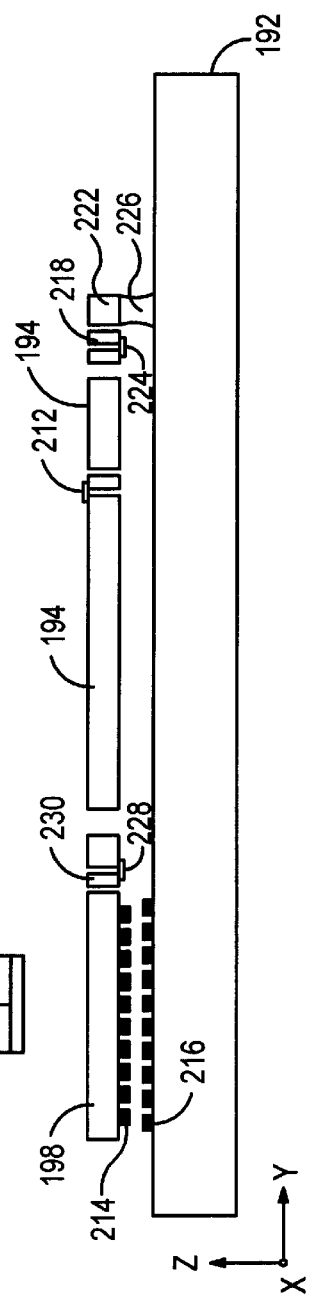
FIG. 15 is a side view of the mover and frame of FIG. 14, shown in a rest position.
Figure 16:
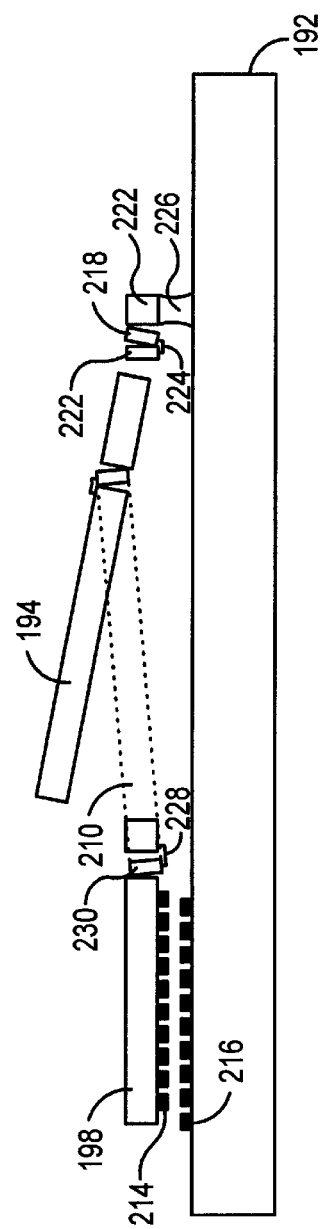
FIG. 16 is a side view of the mover and frame of FIG. 15, but shown in an operational state.

As shown in FIGS. 14–16, the protrusion elements 218 and 220 of the hinge are coupled to the support member 222 by membrane flexures 224. The support member 222 is connected to the substrate 192 by a connection layer 226. A membrane flexure 228 is also used to connect the mover 198 to a hinged region 230 of the frame drive rod 210.

The assembly for manipulating the micromirror 190 is shown in a rest position in FIG. 15. The surface electrostatic arrangement that drives the mover 198 includes a set of electrodes 214 on the mover and a second set of electrodes 216 on the substrate 192. The patterns of electrodes preferably are consistent with the patterns described with reference to FIG. 10. Thus, for every six mover electrodes 214, there are seven substrate electrodes 216. This is the preferred embodiment, but other arrangements may be utilized without diverging from the invention. The sets of electrodes 214 and 216 are drive electrodes. While not shown in FIGS. 15 and 16, the mover 198 and the substrate 192 also include levitator electrodes. The mover 196 of FIG. 13 includes a similar surface electrostatic arrangement for levitating and driving the mover.

When the mover 198 is in a rest position, the reflecting surface of the micromirror 190 lies parallel to the top surface of the mover. That is, the frame 194 and the micromirror are in the positions illustrated in FIG. 15. However, when the mover is energized by varying the voltage patterns along either or both of the sets of drive electrodes 214 and 216, the mover applies a force along the frame drive rod 210. By displacing the mover rightwardly, the force applied to the frame drive rod tends to pivot the frame 194 and the micromirror out of the plane of the mover. The membrane flexures 212, 224 and 228 allow the frame 194 to pivot to the out-of-plane position shown in FIG. 16. Preferably, the micromirror is able to rotate about at least 20° from the rest position of FIG. 15. More preferably, the rotation extends to at least 30°. In the most preferred embodiment, the rotation is extended to 45°.

Referring again to FIG. 13, the operation of the mover 196 is generally identical to the operation of the mover 198. However, there is some additional complexity. The flexural connection between the mirror drive rod 206 and the micromirror 190 is more difficult, since the connection between the mover 196 and the micromirror 190 must allow some twisting as the micromirror is tilted with respect to the frame 194 and with respect to the substrate 192. A relieved section 232 along the mirror drive rod 206 facilitates bending as the micromirror is tilted. It should be noted that the micromirror rotation by the mover 196 should not be initiated while the frame 194, the micromirror 190 and the frame drive rod 210 are coplanar, as shown in FIG. 15, since the frame drive rod will interfere with movement of the frame 194. Consequently, the micromirror should be tilted before the initial movement of the mover 196. Preferably, the mover 196 is able to rotate the micromirror 190 at least 20°. More preferably, the rotation is at least 30°.

What is claimed is:

1. An optical switch comprising:
   a plurality of optical inputs;
   a plurality of fixed mirror arrangements;
   a plurality of pivotable mirrors; and
   a plurality of optical outputs;
   wherein said fixed mirror arrangements and said pivotable mirrors are arranged to form optical paths from said inputs to said outputs, each optical path including reflection from at least one fixed mirror arrangement and at least two pivotable mirrors; and
   wherein a first array of said pivotable mirrors and a first fixed mirror arrangement are on different sides of a common support structure, said first array of pivotable mirrors being arranged along a first side of said common support structure and said first fixed mirror arrangement being arranged on a second side of said common support structure, said second side being opposite to said first side such that reflections directly between said pivotable mirrors and said first fixed mirror arrangement are unavailable.

2. The optical switch of claim 1 further comprising a plurality of said support structures, each said support structure having an array of said pivotable mirrors arranged along a first side and having one of said fixed mirror arrangements on a second side that is opposite to said first side.

3. The optical switch of claim 1 wherein each said pivotable mirror is mounted for movement about first and second perpendicular axes.

4. The optical switch of claim 1 wherein said optical inputs include a plurality of matrices of input collimators, said optical outputs including a plurality of matrices of output collimators.

5. The optical switch of claim 1 wherein each said pivotable mirror is an individually controlled micromirror.

6. The optical switch of claim 1 wherein said optical inputs are arranged on a plurality of side-by-side input modules and wherein said optical outputs are arranged on a plurality of side-by-side output modules, each said input module having a set of said optical inputs and having at least one said support structure, each said output module having a set of said optical outputs and having at least one support structure, wherein an optical path from one of said optical inputs to one of said optical outputs includes reflections at support structure of adjacent said input modules and reflections at support structures of adjacent said output modules.

7. The optical switch of claim 6 wherein said input and output modules are cooperatively positioned such that said optical path from said optical input to said optical output includes:
   (a) reflections at said fixed mirror arrangement and at a specific said pivotable mirror of adjacent said input modules, and
   (b) reflections at said fixed mirror arrangement and said a specific said pivotable mirror of adjacent said output modules.

8. An optical switch comprising:
   a plurality of first arrays of first optical signal conductors;
   a plurality of second arrays of second optical signal conductors; and
   a plurality of mirror-support members having first reflection-inducing sides with generally fixed properties with respect to redirecting optical signals impinging thereon, said mirror-support members having second reflection-inducing sides manipulable properties with respect to locally varying redirection of optical signals impinging thereon, each said second reflection-inducing side having a third array of micromirrors that are mounted for movement about perpendicular axes, said mirror-support members being positioned relative to said first arrays and said second arrays such that said first optical signal conductors are selectively coupled to any one of a plurality of said second optical signal conductors by manipulation of said micromirrors and by reflection from said refection-inducing sides, each said mirror-support member being configured to reflect a first optical signal from said first reflection-inducing side to isolate said first signal from impinging said second reflection-inducing side, said mirror-support member being further configured to reflect a second optical signal from said second reflection-inducing side to isolate said second signal from impinging said first reflection-inducing side.

9. The optical switch of claim 8 wherein said micromirrors are individually addressable for rotations about first and second axes.

10. The optical switch of claim 8 wherein each said mirror-support member is cooperative with said first and second arrays to form optical paths from said first optical signal conductors to said second optical signal conductors, each said optical path including reflections at two of said micromirrors and at two first reflection-inducing sides.

11. The optical switch of claim 10 wherein each said first reflection-inducing side is a coating of reflective material.

12. The optical switch of claim 10 wherein each third array of micromirrors is dedicated to exchanging optical signals with a single other said third array of micromirrors.

13. The optical switch of claim 12 wherein said each third array of micromirrors is operationally dedicated to a single first array and to a single second array.

14. The optical switch of claim 10 wherein each said optical path originates at one of said first optical signal conductors, impinges a specific first reflection-inducing side, is selectively redirected by a pair of said micromirrors, and terminates at one of said second optical signal conductors.

15. A method of switching optical signals from one of a plurality of optical inputs to any one of selected optical outputs comprising the steps of:

providing a plurality of arrays of pivotable mirrors and a plurality of fixed mirrors, including providing support structures having one of said arrays of pivotable mirrors on a first side and having at least one said fixed mirror on a second side, said first side being a different side from said second side; and with regard to an optical beam from any one of said optical inputs, following the steps of:

reflecting said optical beam from said pivotable mirrors of at least two of said arrays and from at least one said fixed mirror, while restricting said optical beam to reflecting from only one of said first and second sides of any single said, support structure; and manipulating said pivotable mirrors to direct said optical beam to a selected one of said optical outputs.

16. The method of claim 15 wherein said step of providing said support structures includes forming each said support structure to include a reflective layer on said second side and a matrix of electrostatically manipulated micromirrors on said first side.

17. The method of claim 15 wherein said steps of reflecting said optical beam and manipulating said pivotable mirrors include:

directing said optical beam from one of said optical inputs to a first one of said fixed mirrors;

reflecting said optical signal from said first one of said fixed mirrors to a first one of said pivotable mirrors;

manipulating said first one of said pivotable mirrors to establish an angle for redirecting said optical beam to a selected second one of said pivotable mirrors;

reflecting said optical beam from said first and selected second ones of said pivotable mirrors toward a second one of said fixed mirrors; and reflecting said optical beam from said second one of said fixed mirrors toward said selected one of said optical outputs, wherein said step of manipulating said first one of said pivotable mirrors is determinative of said selected one of said optical outputs.

18. The method of claim 17 further comprising a step of manipulating said selected one of said pivotable mirrors to increase coupling of said optical beam to said selected one of said optical outputs.

19. The method of claim 17 wherein each of said steps of reflecting said optical beam from said fixed mirrors includes providing a beam path fold of approximately ninety degrees.

20. The method of claim 15 further comprising steps of arranging said optical inputs in a plurality of arrays of input collimators and arranging said optical outputs in a plurality of arrays of output collimators.

21. The method of claim 20 further comprising steps of operatively dedicating one of said arrays of pivotable mirrors to each one of said arrays of input collimators and operatively dedicating one of said arrays of pivotable mirrors to each of said arrays of output collimators.

* * * * *